Patented Aug. 13, 1940

2,211,465

UNITED STATES PATENT OFFICE 2,211,465

MANUFACTURE OF BROMINATED PHTHALIC ACID

Paul W. Jewel and John R. Pratt, Los Angeles, Calif., assignors to Max Factor & Co., Los Angeles, Calif., a corporation of Delaware No Drawing. Application September 22, 1939, Serial No. 296,098

11 Claims. (Cl. 260—515)

The present invention is primarily directed to a process of forming bromine derivatives of organic acids of the aromatic series whereby the bromination is readily controlled and the formation of the monobrom derivatives is readily accomplished with high accompanying yields.

Ordinarily, the regulated bromination of organic acids of the aromatic series is a difficult procedure and in many cases can be accomplished only through the use of active catalysts or very severe operating conditions. Moreover, bromination of these acids results in many different side reactions and in marked destruction of the starting material, these characteristics rendering the bromination impractical on a commercial scale. Furthermore, when it is desired to produce the monobrom derivatives, either no reaction takes place or a mixture of unbrominated material, together with products in all degrees of bromination, is obtained. The separation of the monobrom derivative from this mixture of material in various degrees of bromination is virtually impossible and the yield is economically insignificant.

The present invention is particularly directed toward a method whereby the monobrom derivatives of various organic acids of the aromatic series (such as phthalic, mellitic, benzoic, salicylic, phenyl-acetic, etc.), are attained by the use of an oxidizing agent having a sufficient potential to oxidize hydrobromic acid to hypobromous acid in a reaction mixture containing a bromide and an organic acid salt of an alkali from the group consisting of sodium and potassium.

Generally stated, the process of the present invention comprises forming a reaction mixture containing the organic acid of the aromatic series, a bromide and an oxidizing agent (preferably a hypochlorite), these ingredients being in the form of alkali metal compounds or salts, the alkali being from the group consisting of sodium and potassium. Such reaction mixture is then slowly acidified and slowly heated and after the reaction is complete the mixture is acidified so as to permit the separation therefrom of a brominated organic acid.

An object of the present invention, therefore, is to disclose and provide a novel, rapid and readily controllable method of producing brominated derivatives of organic acids of the aromatic series.

A specific object of the invention is to disclose and provide an economical and practical method of preparing 3-brom phthalic acid and its compounds.

Other objects, uses, advantages and adaptations of the invention will become apparent to those skilled in the art from the following description.

Although the process of this invention is adapted for use in the bromination of various organic acids of the aromatic series, it will be described in detail as it pertains to the bromination of phthalic acid since brominated derivatives of this acid are used in large quantities in the cosmetic and other industries.

In the manufacture of the monobrom derivatives of phthalic acid on a commercial scale, phthalic anhydride, sodium bromide and sodium hypochlorite are used as the starting materials together with a suitable alkali such as, for example, commercial sodium hydroxide. A typical exemplary operation includes the following materials and steps:

52 pounds of phthalic anhydride are dissolved in 25 gallons of water with the aid of about 18 pounds of commercial sodium hydroxide. To this are then added 36.3 pounds of sodium bromide (preferably U. S. P.) and 20 gallons of commercial sodium hypochlorite solution (16%). To this mixture, 10 gallons of commercial muriatic acid are added and the mixture thoroughly agitated. The temperature is then gradually raised to about 65–75° C.; ordinarily, about 3 hours are consumed in reaching this temperature. 10 additional gallons of commercial muriatic acid are then added, this amount of acid being added in small increments or portions such as, for example, 2 gallon portions, over a total period of 4 to 6 hours. The temperature is maintained within the range 65–75° C.

After the acid has been added as above described, the temperature of the mixture is raised to between about 90° C. and 100° C. or until the solution clears and the reaction is completed. In rare instances it may be necessary to maintain the mixture at the elevated temperatures given for some time before the reaction reaches completion.

The solution is then permitted to cool and, in order to purify it, is made alkaline by the addition of a suitable quantity of alkali such as commercial sodium hydroxide. In the example given, 36 pounds of commercial sodium hydroxide are employed. After the mixture is made alkaline, it is filtered and some impurities are thus removed.

The purified solution contains the sodium salt of the monobrom derivative of phthalic acid. A number of methods of treatment are now available for the separation of the brominated derivative. For example, the substantially clear filtrate may be placed in a glass-lined or wooden tank and acidified by the addition of muriatic acid until the pH of the solution is reduced to between about 2 and 4.

In the specific example, 10 gallons of muriatic acid were used and a pH of about 3 resulted. The monosodium salt of 3-brom phthalic acid is now allowed to crystallize out, the mass is filtered and the salt is washed and dried.

It may be noted that the addition of acid last mentioned above is preferably made gradually and may be continued until further addition of acid does not produce any additional precipitation of the salt. A material excess of acid (sufficient to reduce the pH to below 2) is not desired.

A second method of recovering the salt is to take the filtered alkaline solution, make it strongly acid, cool the acidified solution by means of refrigeration, and permit the material to crystallize out as the free acid. This method generally results in a smaller yield and the filtration and drying present some difficulty.

The monobrom phthalic acid may be separated from the reaction mixture (prior to the purification above noted) or from an aqueous solution containing the sodium salt of monobrom phthalic acid (which is obtained as a result of the purification step above noted), by making acid with hydrochloric acid and extracting the solutions with an organic solvent immiscible with aqueous salt solutions, said organic solvent being preferably from the group of aliphatic alcohols and ethers.

Illustrative solvents comprise isopropyl alcohol and the di-ether of ethylene glycol, commonly known as dioxan. These solvents should be capable of dissolving monobrom phthalic acid and should be poor solvents for sodium chloride. Some of these solvents are water-miscible but become immiscible if the water contains salt in solution. In other words, the preferred solvents to be employed should exert a solvent effect for the brominated phthalic acid and should be capable of being salted out.

As an example of the extraction process herein referred to, the purified alkaline solution of the sodium salt of monobrom phthalic acid may be acidified in order to liberate monobrom phthalic acid and the acidified solution is then mixed with approximately ½ volume of an organic solvent, for example, dioxan. In other words, 25 gallons of dioxan are added to 50 gallons of the acidified solution in a separator, the mixture thoroughly agitated and then allowed to stratify. It will be found that a layer will be formed composed of dioxan containing the monobrom phthalic acid in solution. This dioxan solution may be separated from the remaining layer of salt solution and this dioxan solution may then be used in scrubbing, extracting or treating another batch of the purified and acidified reaction solution. This process of extraction permits recovery of almost 100% of the brominated derivative. The salt saturation of the aqueous phase of the solution being treated with the solvent can well be between 10% and 50%. In order to assure effective salting out of the solvent together with its brominated derivative, the concentration of the salt may have to be varied with different solvents.

Yields of 3-brom phthalic acid manufactured in accordance with the above method appear to consistently produce a recovery which is approximately 75% of that theoretically possible.

Moreover, it is to be noted that no excess of any of the reacting ingredients need be added and that the entire reaction proceeds smoothly to completion in a relatively short period of time and at substantially atmospheric pressures, without the necessity of using expensive catalysts. As a result, the monobrom derivative of phthalic acid may be produced very economically.

The reactions which take place during the process are rather complex but it is assumed that the addition of hydrochloric or muriatic acid to the aqueous solution of phthalic anhydride, sodium hypochlorite and sodium bromide results in the liberation of hypochlorous acid from the hypochlorite and the liberation of hydrobromic acid from the sodium bromide. The hypochlorous acid then oxidizes the hydrobromic acid into hypobromous, which is the effective brominating agent released within the reaction mixture, water being formed as a result of the bromination. Any oxidizing agent having a sufficiently high oxidation potential to oxidize the hydrobromic acid to hypobromous acid, may be employed.

Although sodium hydroxide and the sodium salts have been used in the example given herein, the potassium salts can also be employed and potassium hydroxide or other suitable potash alkali may be used instead of sodium hydroxide. The use of potassium instead of sodium salts is not conducive to a process which is as readily controlled as that which is attained by the use of sodium.

We claim:

1. In a process of brominating organic acids of the aromatic series, the steps of: forming an alkaline solution consisting essentially of bromides, hypochlorites and organic acid salts of an alkali metal from the group consisting of sodium and potassium, then gradually acidifying the mixture while gradually warming the mixture to about 70° C.; then heating the mixture to between about 90° C. and 100° C. to complete the reaction, and separating a brominated organic acid from the reaction liquid.

2. In a process of brominating organic acids of the aromatic series, the steps of: forming an alkaline solution consisting essentially of bromides, hypochlorites and organic acid salts of an alkali metal from the group consisting of sodium and potassium, said bromide, hypochlorite and organic acid being present in substantially molecular equivalent proportions, then gradually acidifying the mixture while gradually warming the mixture to about 70° C.; then heating the mixture to between about 90° C. and 100° C. to complete the reaction, and separating a salt of brominated organic acid from the reaction liquid.

3. In a process of brominating organic acids of the aromatic series, the steps of: forming an alkaline solution consisting essentially of bromides, hypochlorites and organic acid salts of an alkali metal from the group consisting of sodium and potassium, then gradually acidifying the mixture while gradually warming the mixture to about 70° C.; then heating the mixture to between about 90° C. and 100° C. to complete the reaction, cooling the reaction mixture, rendering the same alkaline, filtering to remove impurities, and then separating a brominated organic acid from the filtrate.

4. In a process of brominating organic acids of the aromatic series, the steps of: forming an alkaline solution consisting essentially of bromides, hypochlorites and organic acid salts of an alkali metal from the group consisting of sodium and potassium, said bromide, hypochlorite and organic acid being present in substantially molecular equivalent proportions, then gradually acidifying the mixture while gradually warming the mixture to about 70° C.; then heating the mixture to between about 90° C. and 100° C. to complete the reaction, cooling the reaction mixture, rendering the same alkaline, filtering to remove impurities, and then separating a brominated organic acid from the filtrate by acidifying the said filtrate to liberate the brominated organic acid and extracting the same from the filtrate with an organic solvent immiscible with an aqueous salt solution, said solvent being from the group of aliphatic alcohols and ethers.

5. In a process of brominating organic acids of the aromatic series, the steps of: forming an alkaline solution consisting essentially of bromides, hypochlorites and organic acid salts of an alkali metal from the group consisting of sodium and potassium, then gradually acidifying the mixture while gradually warming the mixture to about 70° C.; then heating the mixture to between about 90° C. and 100° C. to complete the reaction, cooling the reaction mixture, rendering the same alkaline, filtering to remove impurities, and then separating a brominated organic acid from the filtrate by acidifying the alkaline filtrate and extracting the same with dioxan.

6. A method of manufacturing a monobrom derivative of phthalic acid which comprises: forming an aqueous solution consisting essentially of the bromide, hypochlorite and phthalate of an alkali metal from the group consisting of sodium and potassium, gradually acidifying the mixture while warming the same to about 70° C.; then heating the mixture to between about 90° C. and 100° C. to complete the reaction; cooling the reaction mixture, rendering the reaction mixture alkaline, filtering, and then separating an alkaline salt of the monobrom derivative of phthalic acid from the filtrate by acidifying such filtrate to a pH of between 2 and 4 and allowing the alkali salt to crystallize from the acidified filtrate.

7. A method of manufacturing a monobrom derivative of phthalic acid which comprises: forming an aqueous solution consisting essentially of the bromide, hypochlorite and phthalate of an alkali metal from the group consisting of sodium and potassium, said bromide, hypochlorite and phthalate being present in substantially molecular equivalent proportions, gradually acidifying the mixture while warming the same to about 70° C.; then heating the mixture to between about 90° C. and 100° C. to complete the reaction; cooling the reaction mixture, rendering the reaction mixture alkaline, filtering, strongly acidifying the filtrate, and extracting the filtrate with dioxan.

8. A method of manufacturing a monobrom derivative of phthalic acid, which comprises: forming an aqueous solution consisting essentially of the bromide, hypochlorite and phthalate of an alkali metal from the group consisting of sodium and potassium, said bromide, hypochlorite and phthalate being present in substantially molecular equivalent proportions; then gradually acidifying the mixture while warming the same to about 70° C., then further acidifying and heating the mixture to form hypobromous acid and complete the reaction; cooling the mixture, and separating a brominated phthalate from the mixture.

9. In a method of separating monobrom phthalic acid from an aqueous solution containing the sodium salt of monobrom phthalic acid, which comprises: acidifying an aqueous solution containing the sodium salt of monobrom phthalic acid to liberate monobrom phthalic acid, and then extracting said acidified solution with an organic solvent immiscible with an aqueous salt solution, said solvent being from the group of aliphatic alcohols and ethers.

10. In a method of separating monobrom phthalic acid from an aqueous solution containing the sodium salt of monobrom phthalic acid, which comprises: acidifying an aqueous solution containing the sodium salt of monobrom phthalic acid to liberate monobrom phthalic acid, and then extracting said acidified solution with di-ether of ethylene glycol.

11. A method of manufacturing monosodium salts of monobrom phthalic acid which comprises: forming an aqueous solution consisting essentially of the bromide, hypochlorite and phthalate of sodium, such bromide, hypochlorite and phthalate being present in substantially molecular equivalent proportions, gradually acidifying the mixture while warming the same to about 70° C., then heating the mixture to between about 90° C. and 100° C. to complete the reaction, cooling the reaction mixture, rendering the reaction mixture alkaline with sodium hydroxide, filtering, adding the hydrochloric acid to the filtrate to bring the pH of the filtrate to between about 2 and 4, and crystallizing the monosodium salt of monobrom phthalic acid from such acidified filtrate.

PAUL W. JEWEL.
JOHN R. PRATT.